April 30, 1957  J. C. McMURRAY  2,790,676
BUG DEFLECTOR FOR AUTOMOBILES
Filed March 4, 1955  2 Sheets—Sheet 1
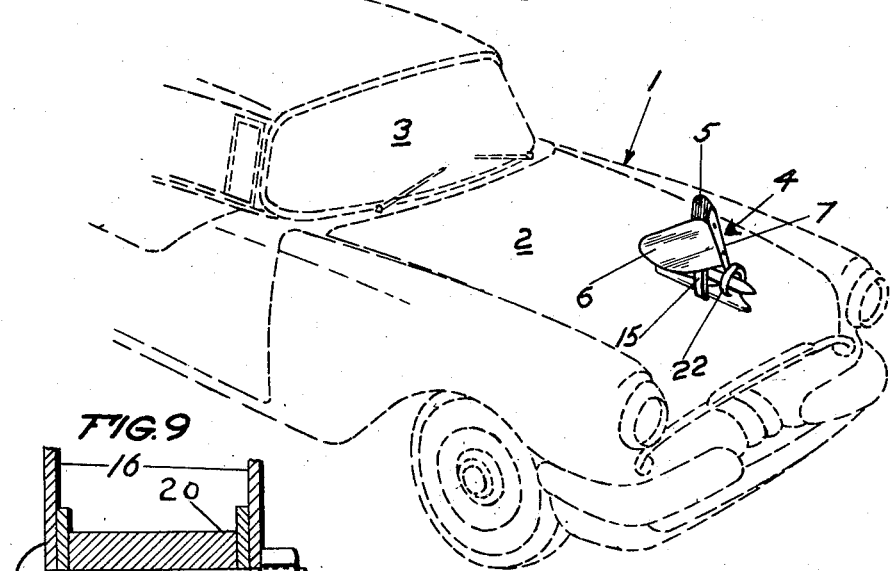
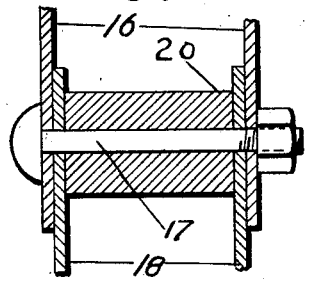
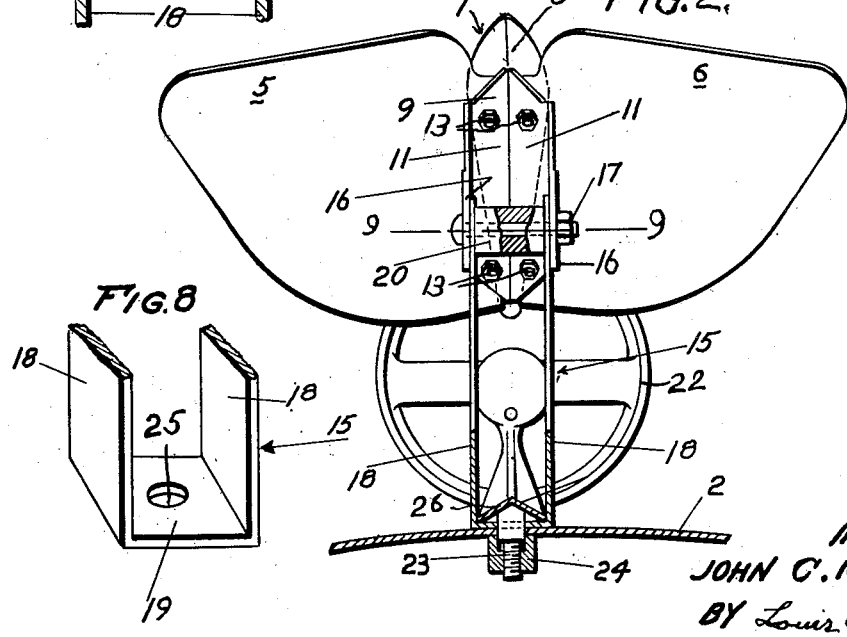
INVENTOR
JOHN C. McMURRAY
BY Louis C. Smith
ATTORNEY

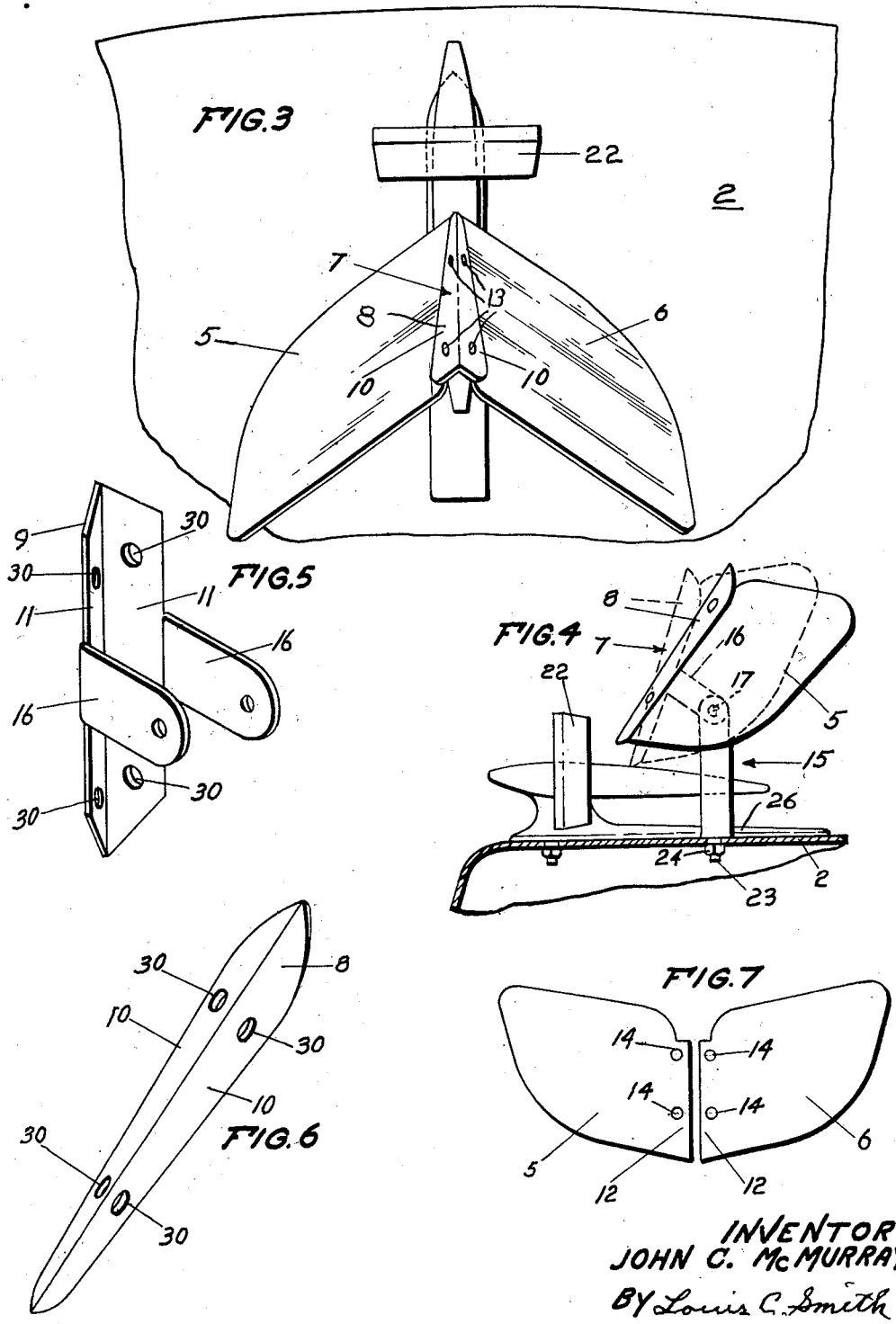

United States Patent Office 2,790,676
Patented Apr. 30, 1957

2,790,676

BUG DEFLECTOR FOR AUTOMOBILES

John C. McMurray, Winthrop, Mass.

Application March 4, 1955, Serial No. 492,150

1 Claim. (Cl. 296—91)

This invention relates to a bug deflector for automobiles such as are commonly mounted on the hood of the automobile for producing air currents when the automobile is in motion for the purpose of deflecting bugs, rain, snow, etc., away from the windshield of the automobile.

An object of the invention is to provide a novel bug deflector in which the deflecting element by which the desired air currents are produced is divided vertically to present two separate wing portions which are independently and detachably mounted on a supporting member, so that each wing portion can be easily detached from the supporting member and replaced by another wing portion.

The wing portions of a bug deflector provide a good advertising medium, and where each wing portion carries an advertisement it is desirable that such wing portions can be readily detached from the mounting member to be replaced by other wing portions whenever it is desired to change the advertising displayed by the device, and my invention provides for doing just that.

Another object of the invention is to provide a bug deflector in which the deflecting member is pivotally mounted, so that its angular position can be changed as necessary to provide the most efficient bug deflecting air currents for the particular automobile on which it is mounted.

Other objects of the invention are to improve bug deflectors in various particulars as more fully hereinafter set forth and then pointed out in the claim.

In the drawings:

Fig. 1 is a perspective view of the front portion of an automobile having my improved bug deflector mounted on the hood thereof;

Fig. 2 is a rear view of the bug deflector as seen by the driver of the car with the supporting bracket in section;

Fig. 3 is a top plan view of the bug deflector;

Fig. 4 is a side view of the bug deflector showing it mounted on the automobile hood, the hood being in section;

Fig. 5 is a perspective view of the rear member of the deflector supporting element looking from the rear;

Fig. 6 is a perspective view of the front member of the deflector supporting element looking from the front;

Fig. 7 shows the two separate wing portions of the bug deflector element;

Fig. 8 is a fragmentary perspective view of the lower end portion of the supporting bracket for the bug deflector.

Fig. 9 is an enlarged section through the pivotal mounting for the bug deflector on the line 9—9, Fig. 2.

In the drawings, 1 indicates the front end of an automobile having the hood portion 2 and the windshield 3.

The bug deflecting device embodying my invention is indicated generally at 4 and is designed to be mounted on the front end of the automobile hood, as shown in Fig. 1.

The device comprises an air deflecting member which is divided vertically to present two separate wing portions 5 and 6, both of which are detachably mounted on a deflector supporting member indicated generally at 7. The member 7 is shown as formed in two sections between which the inner edges of the wing portions 5 and 6 are clamped, said two sections including a front section 8 and a rear section 9. Each section is angular in cross section, the front section presenting the two side portions 10 which have an angular relation as shown in Fig. 3, and the rear section 9 having the two side portions 11 which also have an angular relation to each other. The front and rear sections 8 and 9 are arranged in registering relation, as shown best in Fig. 3, and the inner edges 12 of the two separate wings 5 and 6 are clamped between the side portions of the two sections 8 and 9, as also indicated in Fig. 3, said wings, however, being detachably secured in place. For this purpose there is provided two pairs of clamping bolts 13, the bolts of one pair extending through the corresponding side portions 10 and 11 of the two sections 8 and 9 and through apertures 14 formed in one of the wing portions, and the other pair of clamping bolts extending through apertures in the other corresponding side portions 10 and 11 and through apertures 14 in the other wing member.

The shape of the front and rear sections 8 and 9 of the deflector supporting member position the wings 5 and 6 at an angle to each other, as shown clearly in the drawings, and each wing member can be readily removed from the deflector support 7 by simply removing the corresponding clamping bolts, and another wing member can be readily replaced and clamped in position.

The deflector support 7 with the wings 5 and 6 detachably mounted thereon is secured to the automobile through the medium of a bracket member 15, and the deflector support 7 is pivotally mounted on the bracket 15 to permit the said support to be turned into different angular positions, thereby to vary or change the position of the wings 5, 6 so that they may be placed at the most efficient angle to accomplish their purpose of deflecting bugs from the windshield 3.

For this purpose the rear section 9 of the deflector holder 7 is formed with rearwardly extending arms 16 which embrace the upper end of the bracket 15, and said arms 16 are pivotally connected to the bracket through the medium of a pivot bolt 17. The bracket 15 is shown as provided with two arms 18 which are connected at their lower ends by a bridge portion 19 and the upper ends of the arms through which the pivotal bolt 17 extends are held spaced from each other by a spacing member 20 which may be of wood or any other suitable material and through which the pivotal bolt extends. The bolt 17 carries a clamping nut 21, so that by tightening the nut 21 a friction is produced between the arms 16 and the upper end of the bracket 15 which is sufficient to hold the deflector support 7 in any adjusted angular position. This construction, however, permits the deflector supporting member 7 with the wings 5, 6 to be turned into different angular positions, and thereby it is possible to set the deflector in the proper position to produce the best bug deflecting result on any automobile on which it may be installed.

The bracket 15 may be secured to the hood of the automobile in any suitable way. Most automobiles are made with an ornament such as indicated at 22 which is secured to the hood at the front thereof, and it is a common practice to provide such ornaments with one or more depending screwthreaded studs 23 which extend through the hood, and each of which receives a clamping nut for clamping the ornament to the hood.

As shown in the drawings, the ornament 22 has rigid therewith the depending screwthreaded stud 23 which extends through the hood and which receives the clamping nut 24 by which the ornament is clamped to the hood.

The bridge portion 19 of the bracket 15 is provided with an opening of a size to receive the stud 23 and in mounting the deflecting device on an automobile the clamping nuts 24 may be removed from the studs 23 and the ornament lifted from the hood and the portion 26 thereof inserted between the arms 18 of the bracket 15 with the stud 23 extending through the opening 25 in the bracket, and then the assembled ornament and bracket may be replaced on the hood with the stud 23 extending through the opening in the hood, after which the clamping nut 24 will be applied and thereby the bracket is clamped thus firmly to the hood by means of the ornament.

I claim:

A bug deflector for attachment to the hood of an automobile, said deflector comprising an elongated deflector-holding support presenting front and rear mating sections, a deflector having two separate and independent wing portions, means detachably clamping the inner edge of one wing portion between the front and rear sections of the support on one side edge thereof, other means detachably clamping the inner edge of the other wing portion between said mating sections of the support on the other side thereof, the rear section of the support having at each side edge thereof a rearwardly directed arm extending at right angles to said edge, said arms being parallel to each other, a bracket having two spaced side portions parallel to each other and also having at its lower end means for attachment to the hood of an automobile, a spacing element situated between the side portions of the bracket at their upper ends and engaging each side portion, said upper ends of the bracket side portions being located between the arms of the rear section of the deflector-holding support, a pivot bolt extending through said arms of the support, the side portions of the bracket and spacer, and a nut screw-threaded to the bolt by which the said two arms and the two side portions of the bracket may be clamped against the ends of the spacing element thereby to provide a frictional pivotal connection between the support and the bracket, by means of which the deflector-holding support of the deflector may be turned about the bolt into different angular positions and frictionally held in any adjusted position.

References Cited in the file of this patent
UNITED STATES PATENTS

| | | |
|---|---|---|
| D. 166,495 | Reichman | Apr. 15, 1952 |
| 2,231,641 | Schwab | Feb. 11, 1941 |
| 2,334,856 | Atkinson | Nov. 23, 1943 |

FOREIGN PATENTS

| | | |
|---|---|---|
| 1,083,397 | France | June 23, 1954 |